(12) United States Patent
Dos Reis et al.

(10) Patent No.: US 11,427,303 B2
(45) Date of Patent: Aug. 30, 2022

(54) NOISE ABATEMENT SYSTEMS FOR RETRACTABLE LEADING EDGE WING SLATS OF AN AIRCRAFT WING ASSEMBLY

(71) Applicants: EMBRAER S.A., São José dos Campos-SP (BR); USP—UNIVERSIDADE DE SÃO PAULO, São Paulo (BR)

(72) Inventors: Danillo Cafaldo Dos Reis, São José dos Campos-SP (BR); Leandro Guilherme Crenite Simões, São José dos Campos-SP (BR); Micael Gianini Valle Do Carmo, São José dos Campos-SP (BR); Eduardo Lobão Capucho Coelho, São José dos Campos-SP (BR); Leandro Souza De Moura Lima, São José dos Campos-SP (BR); Fernando Martini Catalano, São José dos Campos-SP (BR); Cecil Wagner Skaleski, São José dos Campos-SP (BR); Francisco Keller Klug, São José dos Campos-SP (BR); Marcus Felipe Hori Ochi, São José dos Campos-SP (BR)

(73) Assignees: EMBRAER S.A., São José Dos Campos— Sp (BR); USP—UNIVERSIDADE DE SÃO PAULO, São Paulo (BR)

( * ) Notice: Subject to any disclaimer, the term of this patent is extended or adjusted under 35 U.S.C. 154(b) by 214 days.

(21) Appl. No.: 16/642,166
(22) PCT Filed: Sep. 1, 2017
(86) PCT No.: PCT/BR2017/000105
§ 371 (c)(1),
(2) Date: Feb. 26, 2020

(87) PCT Pub. No.: WO2019/041003
PCT Pub. Date: Mar. 7, 2019

(65) Prior Publication Data
US 2021/0070422 A1 Mar. 11, 2021

(51) Int. Cl.
*B64C 9/24* (2006.01)
*B64C 21/02* (2006.01)

(52) U.S. Cl.
CPC .............. *B64C 9/24* (2013.01); *B64C 21/02* (2013.01); *B64C 2230/14* (2013.01)

(58) Field of Classification Search
CPC ....... B64C 9/24; B64C 21/02; B64C 2230/14; B64C 3/28; Y02T 50/10; Y02T 50/40
See application file for complete search history.

(56) References Cited

U.S. PATENT DOCUMENTS

| 6,454,219 | B1 | 9/2002 | Moe |
| 6,457,680 | B1 | 10/2002 | Dobrzynski et al. |

(Continued)

OTHER PUBLICATIONS

International Search Report for PCT/BR2017/000105, dated Mar. 29, 2018, 5 pages.

(Continued)

*Primary Examiner* — Valentina Xavier
(74) *Attorney, Agent, or Firm* — Nixon & Vanderhye P.C.

(57) ABSTRACT

Noise-abatement systems provide noise abatement to a wing assembly provided with a forward edge slat and include an elongate shield element which is unconnected but positionable adjacent to a lower trailing edge of the edge slat along a lengthwise extent thereof, and a support web having a distal end fixed to the shield element and a proximal end capable of fixation to an interior cove surface of the edge slat adjacent an upper trailing edge thereof. The support web will therefore allow movement of the shield element towards and away from the lower trailing edge of the edge slat between an operative position wherein the shield element is positioned adjacent to the lower trailing edge of the edge slat along the lengthwise extent thereof and an inoperative position wherein the edge slat is spaced from the trailing (Continued)

edge of the edge slat and positioned in the cove region thereof, respectively.

13 Claims, 3 Drawing Sheets

(56) References Cited

U.S. PATENT DOCUMENTS

| | | | | |
|---|---|---|---|---|
| 6,789,769 | B2* | 9/2004 | Mau | B64C 9/24 |
| | | | | 244/130 |
| 8,322,657 | B2 | 12/2012 | West et al. | |
| 8,424,810 | B1* | 4/2013 | Shmilovich | B64C 9/24 |
| | | | | 244/214 |
| 9,242,720 | B2* | 1/2016 | Turner | B64C 3/48 |
| 9,446,836 | B2* | 9/2016 | Pitt | B64C 7/00 |
| 11,001,368 | B2* | 5/2021 | Turner | B64C 3/50 |
| 2008/0251647 | A1* | 10/2008 | Lorkowski | B64C 9/14 |
| | | | | 244/204 |
| 2010/0084508 | A1 | 4/2010 | Hirai et al. | |
| 2012/0097791 | A1 | 4/2012 | Turner et al. | |
| 2021/0070422 | A1* | 3/2021 | Dos Reis | B64C 9/24 |
| 2021/0237850 | A1* | 8/2021 | Turner | B64C 9/24 |

OTHER PUBLICATIONS

Written Opinion of the ISA for PCT/BR2017/000105, dated Mar. 29, 2018, 8 pages.

* cited by examiner

NOISE ABATEMENT SYSTEMS FOR RETRACTABLE LEADING EDGE WING SLATS OF AN AIRCRAFT WING ASSEMBLY

This application is the U.S. national phase of International Application No. PCT/BR2017/000105 filed 1 Sep. 2017, which designated the U.S., the entire contents of which is hereby incorporated by reference.

FIELD

The embodiments disclosed herein relate generally to systems to provide noise abatement for retractable leading edge wing slats of an aircraft wing assembly when the slats are deployed.

BACKGROUND

The noise emitted from an aircraft during take-offs and landings is a significant issue contributing to urban noise pollution in large cities. The aerospace community has been committed since the 1960's to reduce noise levels of commercial aircraft. The maximum noise allowed for an aircraft is regulated by the type certification for the aircraft, for example, the regulations promulgated by PART36 of the Federal Aviation Administration (FAA). These regulatory requirements have imposed more restrictive levels of noise in more recent years.

The progressive introduction of larger and more energy efficient turbofan engines has significantly reduced aircraft engine noise. The non-propulsive part of the airplane (airframe) has however become a major source of noise, mainly during approach and landing phases of flight. One of the most relevant airframe noise source in current aircraft designs are the high-lift devices associated with the aircraft's wings, especially the leading edge devices, such as retractable leading edge wing slats.

There are some prior proposals in the art which are focused on reducing noise generated by leading edge slats, such as those provided by U.S. Pat. Nos. 6,454,219, 8,424,810 and 9,242,720, the entire contents of each being expressly incorporated hereinto by reference. While the proposals in the prior art may be satisfactory for their stated purpose, continual improvements to provide enhanced noise abatement characteristics to retractable leading edge wing slats are still sought.

It is towards providing such improvement to noise abatement characteristics for retractable leading edge wing slats that the embodiments disclosed herein are directed.

SUMMARY

In general, the embodiments disclosed herein relate to noise-abatement systems to provide noise abatement to a wing assembly provided with a forward edge slat when the edge slat is moved from a retracted condition to a deployed condition thereof. The noise-abatement systems will include an elongate shield element (which may have a convex curvature according to certain embodiments) which is unconnected but positionable adjacent to a lower trailing edge of the edge slat along a lengthwise extent thereof, and a support web having a distal end fixed to the shield element and a proximal end capable of fixation to an interior cove surface of the edge slat adjacent an upper trailing edge thereof. In response to movement of the edge slat between the deployed and retracted conditions thereof, the support web will therefore allow movement of the shield element towards and away from the lower trailing edge of the edge slat between an operative position wherein the shield element is positioned adjacent to the lower trailing edge of the edge slat along the lengthwise extent thereof and an inoperative position wherein the edge slat is spaced from the trailing edge of the edge slat and positioned in the cove region thereof, respectively. If desired or necessary (e.g., to reduce weight) a plurality of the webs spaced apart in the lengthwise direction of the lower trailing edge of the slat may be provided.

A spring element may be operatively associated with the web to exert a bias spring force onto the web to move the shield element into the operative position thereof. According to certain embodiments, the spring element is an S-shaped spring leaf element having one end fixed to the proximal end of the web and a distal end attachable to the interior surface of the cove region of the edge slat.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
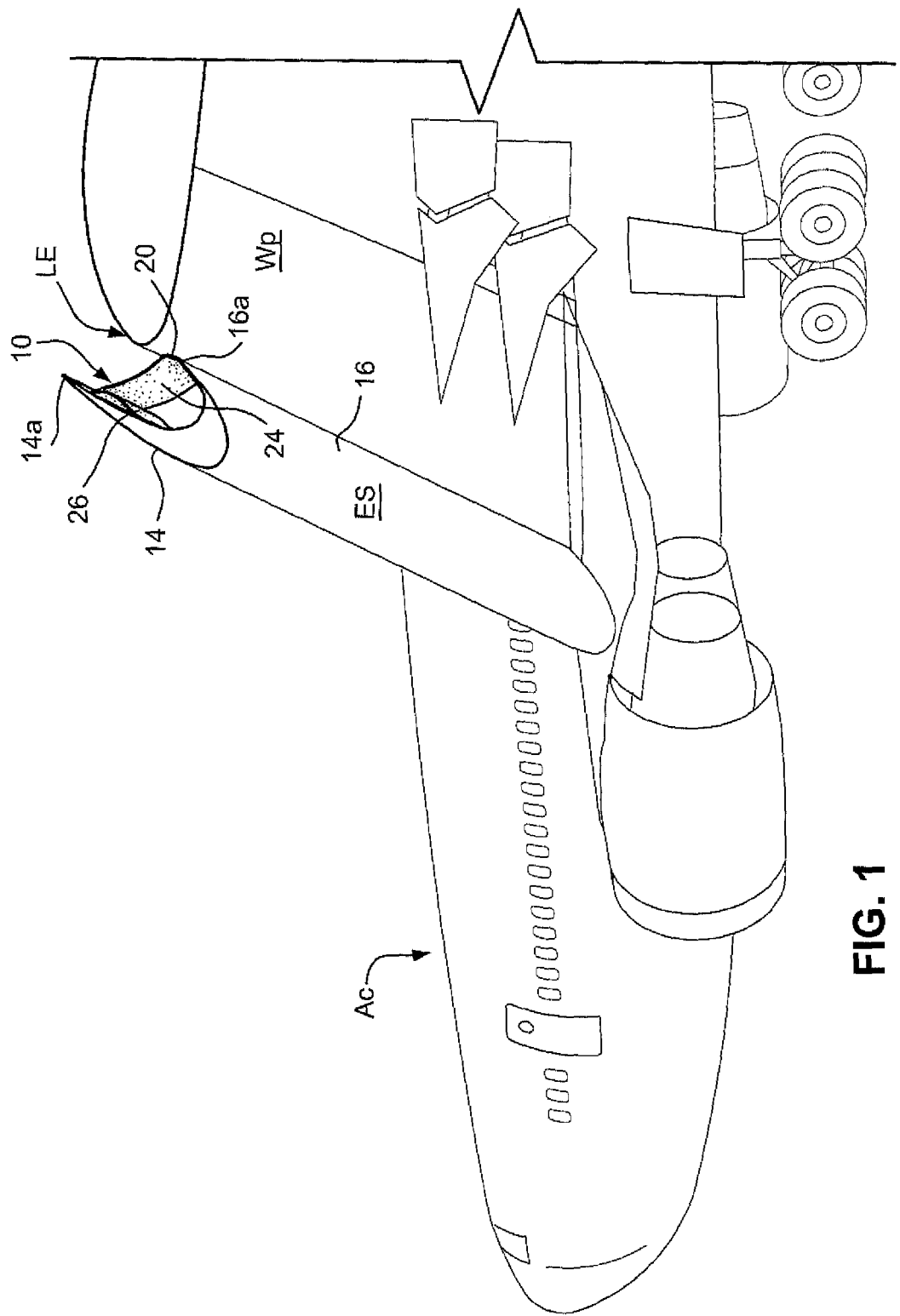
FIG. 1 is a schematic perspective view from below the port side wing of an aircraft having a leading edge slat in a deployed condition.
Figure 2:
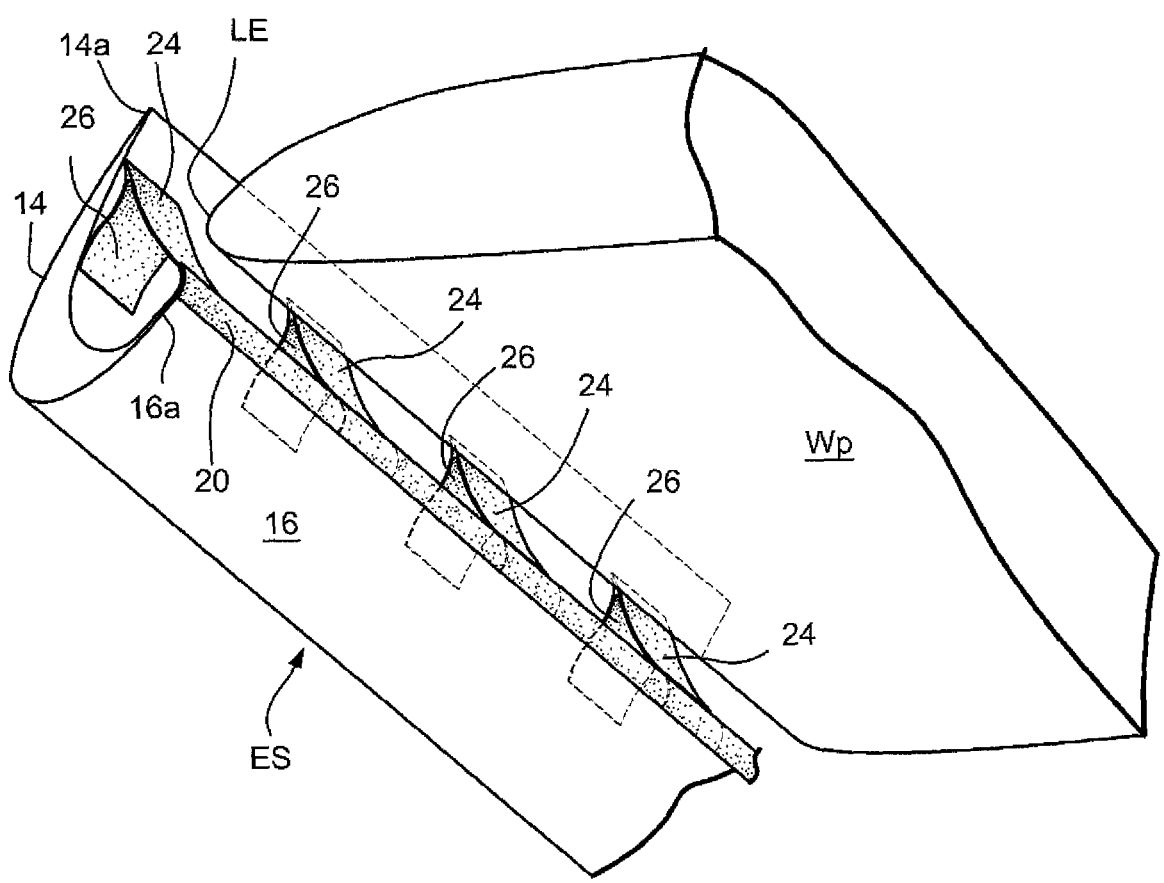
FIG. 2 is an enlarged schematic perspective view of the port side wing and the deployed leading edge slat depicted in FIG. 1.
Figure 3:
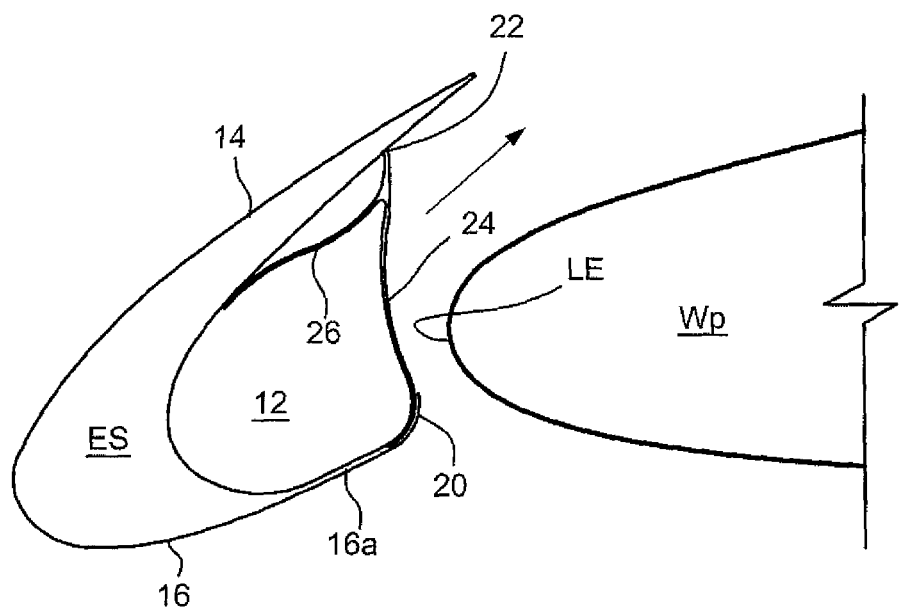
FIGS. 3-5 are schematic profile views of the wing slat depicted in FIG. 1 being moved from its deployed condition to its retracted condition, respectively.
Figure 4:
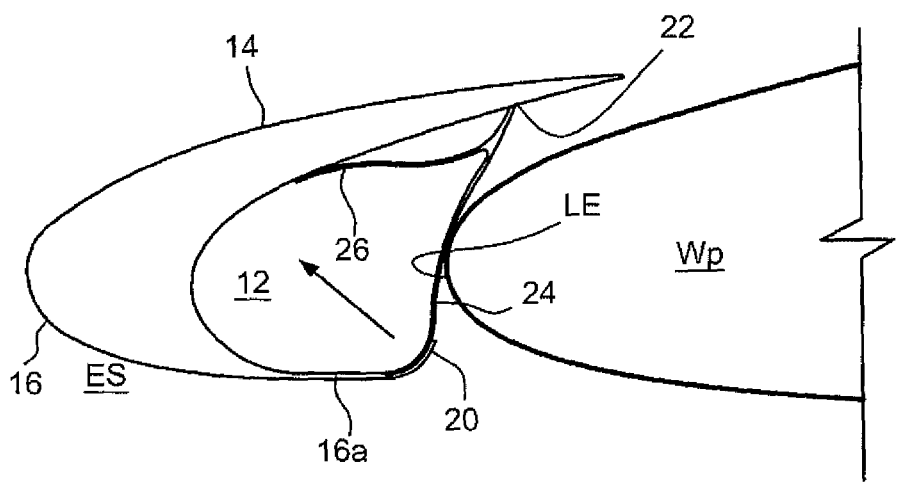

As can be seen in the schematic depiction of FIG. 1, a port side wing Wp of an aircraft AC is provided with a leading edge slat ES shown in its deployed condition. It is of course to be understood that the description of the edge slat ES associated with the port side wing Wp of the aircraft AC is equally applicable to the edge slat association with the starboard side wing (not shown) of the aircraft AC. The edge slate ES may be connected operatively to the wing Wp for movements between its stowed and deployed conditions which are generally forwardly and/or downwardly relative to the leading edge LE of the wing Wp by any suitable slat operating mechanisms (not shown). Important to the embodiments described herein, a noise abatement system 10 is provided for noise abatement purposes when the edge slat ES is in a deployed condition.

The noise abatement system according to embodiments disclosed herein is shown in greater detail with reference to FIGS. 2-5. Specifically, the system 10 includes an elongate shield element 20 extending lengthwise along the lower trailing edge 16*a* of lower slat surface 16. An airstream impinging on the leading edge of the slat ES will thus split so as to flow over the upper and lower slat surfaces 14, 16 having trailing edges 14*a*, 16*a*, respectively. The shield element 20 minimizes vertical recirculating air flow within the cove region 12 (see FIGS. 3-5) of the edge slat ES when deployed. In some embodiments, the shield element 20 may have a convex curvature.

Figure 5:
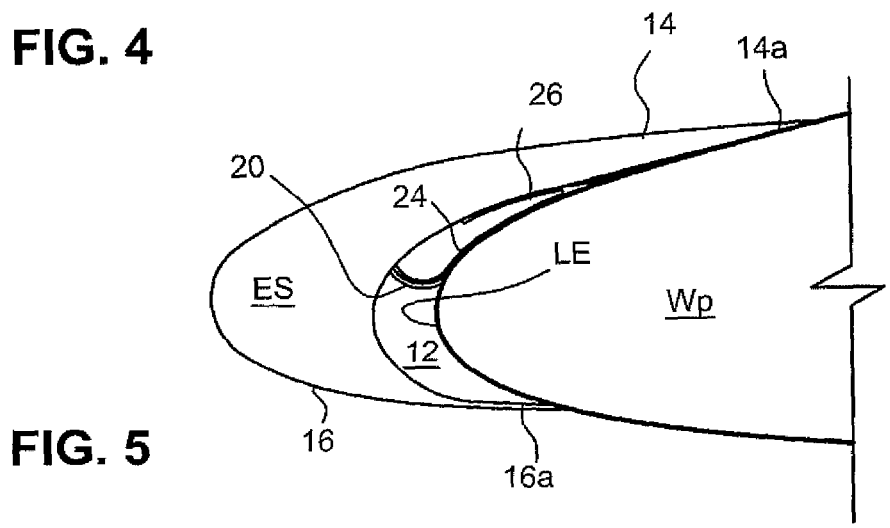

The continuous shield element 20 is attached at region 22 to an inner surface of the cove region 12 adjacent the trailing edge 14a of the upper slat surface 14 by discontinuous support webs 24. A single continuous support web 24 extending in the lengthwise direction of the edge slat ES could also be provided if desired. However, in view of lighter weight, it is more desirable to provide a number of support webs 24 spaced apart from one another along the lengthwise direction of the edge slat ES. The (or each) web 24 therefore has a proximal end connected to the interior surface of the cove region 12 adjacent the trailing edge 14a at attachment region 22 and extends toward the shield element 20 where a distal end thereof is connected thereto. The shape of the support web(s) 24 is most preferably contoured so as to conform to the shape of the leading edge LE of the wing Wp and thereby allow a smooth accommodation of the system when the slat is in the retractable and inoperative condition. The shield element 20 is unconnected to the trailing edge 16a of the edge slat ES so as to be movable from an operative position depicted in FIGS. 2 and 3 whereby the shield element 20 is adjacent to the trailing edge 16a of the edge slat ES and an inoperative position as depicted in FIG. 5 whereby the shield element 20 is spaced from the trailing edge 16a of the edge slat ES and retained within the cove space 12 defined with the leading edge LE of the wing Wp.

In order to assist movement of the shield element 20 from its inoperative position and into an operative position thereof, an S-shaped spring leaf element 26 having one curved end attached to the attachment region 22 and an opposite curved end attached to the inner surface of the edge slat ES within the cove region 12 thereof. The spring leaf element 26 therefore exerts a spring-biased force onto the support web(s) 24 in a direction to resiliently move the shield element 20 from the inoperative position when the edge slat ES is retracted and into the operative position thereof when the edge slat ES is deployed.

The components of the noise-abatement system 10, i.e., the shield element 20, support web(s) 24 and spring leaf element 26 may each be fabricated from any resilient material suitable for use in aerospace applications. Thus, for example, the components of the noise-abatement system 10 may be fabricated from elastomeric materials or shape-memory alloys as may be desired.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A noise-abatement system to provide noise abatement to a wing assembly provided with a forward edge slat when the edge slat is moved from a retracted condition to a deployed condition thereof, wherein the noise-abatement system comprises:

an elongate shield element which is positionable adjacent to a lower trailing edge of the edge slat along a lengthwise extent thereof, and a plurality of support webs spaced apart from one another along the lengthwise extent of the shield element, wherein each support web includes a distal end fixed to the shield element and a proximal end capable of fixation to an interior cove surface of the edge slat adjacent an upper trailing edge thereof, wherein in response to movement of the edge slat between the deployed and retracted conditions thereof, the support webs allow movement of the shield element towards and away from the lower trailing edge of the edge slat between an operative position wherein the shield element is positioned adjacent to the lower trailing edge of the edge slat along the lengthwise extent thereof and an inoperative position wherein the edge slat is spaced from the trailing edge of the edge slat and positioned in the cove region thereof, respectively.

2. The noise-abatement system according to claim 1, which further comprises a spring element operatively associated with the support webs to exert a bias spring force onto the support webs to move the shield element into the operative position thereof.

3. The noise-abatement system according to claim 2, wherein the spring element is an S-shaped spring leaf element having one end fixed to the proximal end of the support webs and a distal end attachable to the interior surface of the cove region of the edge slat.

4. The noise-abatement system according to claim 3, wherein the shield element has a convex curvature.

5. An aircraft wing assembly comprising a forward edge slat and a noise-abatement system to provide noise abatement to the wing assembly when the edge slat is moved from a retracted condition to a deployed condition thereof, wherein the noise-abatement system comprises:

an elongate shield element which is positionable adjacent to a lower trailing edge of the edge slat along a lengthwise extent thereof, and a plurality of support webs spaced apart from one another along the lengthwise extent of the shield element, wherein each support web includes a distal end fixed to the shield element and a proximal end capable of fixation to an interior cove surface of the edge slat adjacent an upper trailing edge thereof, wherein in response to movement of the edge slat between the deployed and retracted conditions thereof, the support webs allow movement of the shield element towards and away from the lower trailing edge of the edge slat between an operative position wherein the shield element is positioned adjacent to the lower trailing edge of the edge slat along the lengthwise extent thereof and an inoperative position wherein the edge slat is spaced from the trailing edge of the edge slat and positioned in the cove region thereof, respectively.

6. The aircraft wing assembly according to claim 5, wherein the noise-abatement system further comprises a spring element operatively associated with the support webs to exert a bias spring force onto the web to move the shield element into the operative position thereof.

7. The aircraft wing assembly according to claim 6, wherein the spring element is an S-shaped spring leaf element having one end fixed to the proximal end of the support webs and a distal end attached to the interior surface of the cove region of the edge slat.

8. The aircraft wing assembly according to claim 7, wherein the shield element has a convex curvature.

9. An aircraft which comprises the aircraft wing assembly according to claim 5.

10. A noise-abatement system to provide noise abatement to a wing assembly provided with a forward edge slat when the edge slat is moved from a retracted condition to a deployed condition thereof, wherein the noise-abatement system comprises:

an elongate shield element which is positionable adjacent to a lower trailing edge of the edge slat along a lengthwise extent thereof, a support web having a distal end fixed to the shield element and a proximal end capable of fixation to an interior cove surface of the edge slat adjacent an upper trailing edge thereof, and a spring element operatively associated with the support web to exert a bias spring force onto the support web to move the shield element into the operative position thereof, wherein in response to movement of the edge slat between the deployed and retracted conditions thereof the support web allows movement of the shield element towards and away from the lower trailing edge of the edge slat between an operative position wherein the shield element is positioned adjacent to the lower trailing edge of the edge slat along the lengthwise extent thereof and an inoperative position wherein the edge slat is spaced from the trailing edge of the edge slat and positioned in the cove region thereof, respectively.

11. The noise-abatement system according to claim 10, wherein the spring element is an S-shaped spring leaf element having one end fixed to the proximal end of the support web and a distal end attachable to the interior surface of the cove region of the edge slat.

12. The noise-abatement system according to claim 11, wherein the shield element has a convex curvature.

13. An aircraft comprising:

an aircraft wing assembly which comprises a forward edge slat; and the noise-abatement system according to claim 10 to provide noise abatement to the wing assembly when the forward edge slat is moved from the retracted condition to the deployed condition thereof.

* * * * *